US010893104B2

(12) United States Patent
Sutardja

(10) Patent No.: US 10,893,104 B2
(45) Date of Patent: *Jan. 12, 2021

(54) IMPLEMENTING A STORAGE SYSTEM USING A PERSONAL USER DEVICE AND A DATA DISTRIBUTION DEVICE

(71) Applicant: Latticework, Inc., Sunnyvale, CA (US)

(72) Inventor: Pantas Sutardja, Los Gatos, CA (US)

(73) Assignee: Latticework, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,663

(22) Filed: Jul. 22, 2019

(65) Prior Publication Data

US 2019/0349430 A1 Nov. 14, 2019

Related U.S. Application Data

(63) Continuation of application No. 15/432,785, filed on Feb. 14, 2017, now Pat. No. 10,412,168.

(Continued)

(51) Int. Cl.
*H04L 29/08* (2006.01)
*H04L 29/06* (2006.01)
(Continued)

(52) U.S. Cl.
CPC .......... *H04L 67/1097* (2013.01); *G06F 3/061* (2013.01); *G06F 3/067* (2013.01);
(Continued)

(58) Field of Classification Search
CPC . H04L 67/10; H04L 67/1097; H04L 67/2814; H04L 63/10; H04L 67/327;
(Continued)

(56) References Cited

U.S. PATENT DOCUMENTS 8,041,824 B1 * 10/2011 Maeng .............. H04W 12/0808
709/229
8,353,012 B2 1/2013 Del Real
(Continued)

FOREIGN PATENT DOCUMENTS

CN 101917439 A * 12/2010
CN 102769883 A * 11/2012
(Continued)

OTHER PUBLICATIONS

Shaukat et al., Cloudlet deployment in local wireless networks: Motivation, architectures, applications, and open challenges, Journal of Network and Computer Applications, 2015. (Year: 2015).*

*Primary Examiner* — Kostas J Katsikis
(74) *Attorney, Agent, or Firm* — Invoke

(57) ABSTRACT

Techniques for implementing a storage system using a personal user device and a data distribution device are disclosed. A personal user device stores a particular content item and transmits the particular content item to a data distribution device for storage. A client device transmits a request for the particular content item to the personal user device. The personal user device determines a characteristic associated with the personal user device, the data distribution device, the client device, and/or the particular content item. Based on the characteristic, the personal user device determines whether to serve the particular content item, or to redirect the client device to the data distribution device to obtain the particular content item. If the client device is redirected, then the client device transmits a request for the particular content item to the data distribution device. The data distribution device transmits the particular content item to the client device.

20 Claims, 8 Drawing Sheets

Related U.S. Application Data

(60) Provisional application No. 62/296,478, filed on Feb. 17, 2016.

(51) Int. Cl.
*G06F 9/50* (2006.01)
*G06F 3/06* (2006.01)

(52) U.S. Cl.
CPC .......... *G06F 3/0635* (2013.01); *G06F 9/5061* (2013.01); *H04L 63/10* (2013.01); *H04L 67/10* (2013.01); *H04L 67/2814* (2013.01); *G06F 3/065* (2013.01)

(58) Field of Classification Search
CPC ............. H04L 67/1002; H04L 67/2842; H04L 12/5691; H04L 45/00; H04L 61/00; H04L 41/28; G06F 3/061; G06F 3/065; G06F 3/067; G06F 3/0635; G06F 9/5061; G06F 3/0601; G06F 9/46
See application file for complete search history.

(56) References Cited

U.S. PATENT DOCUMENTS

| | | | |
|---|---|---|---|
| 8,613,070 B1 | 12/2013 | Borzycki et al. | |
| 9,251,114 B1 | 2/2016 | Ancin et al. | |
| 9,667,657 B2 | 5/2017 | Efremov et al. | |
| 9,699,167 B1 | 7/2017 | Tovino et al. | |
| 10,242,209 B2* | 3/2019 | Rooney | G06F 9/5072 |
| 10,356,206 B2* | 7/2019 | Chen | H04L 67/32 |
| 10,412,168 B2* | 9/2019 | Sutardja | G06F 3/061 |
| 10,652,313 B2* | 5/2020 | Chen | G06F 9/00 |
| 2006/0174029 A1* | 8/2006 | Le | H04L 12/4633 |
| | | | 709/236 |
| 2007/0033148 A1 | 2/2007 | Cahill | |
| 2007/0127430 A1* | 6/2007 | Maeng | H04W 12/0804 |
| | | | 370/338 |
| 2007/0127500 A1* | 6/2007 | Maeng | H04W 12/0806 |
| | | | 370/395.52 |
| 2009/0300635 A1 | 12/2009 | Ferris | |
| 2010/0020766 A1 | 1/2010 | Kang et al. | |
| 2010/0131624 A1 | 5/2010 | Ferris | |
| 2010/0268764 A1* | 10/2010 | Wee | H04L 67/1002 |
| | | | 709/203 |
| 2011/0125823 A1 | 5/2011 | Macken | |
| 2011/0167256 A1 | 7/2011 | Lee et al. | |
| 2011/0264907 A1 | 10/2011 | Betz et al. | |
| 2011/0314165 A1 | 12/2011 | Maes et al. | |
| 2012/0072716 A1 | 3/2012 | Hu et al. | |
| 2012/0076099 A1* | 3/2012 | Yin | H04W 36/0033 |
| | | | 370/329 |
| 2012/0124660 A1* | 5/2012 | Wang | H04L 63/0272 |
| | | | 726/12 |
| 2012/0131075 A1 | 5/2012 | Mawdsley et al. | |
| 2012/0136697 A1 | 5/2012 | Peles et al. | |
| 2012/0136936 A1 | 5/2012 | Quintuna | |
| 2012/0173759 A1 | 7/2012 | Agarwal et al. | |
| 2012/0179824 A1 | 7/2012 | Jackson | |
| 2012/0185555 A1 | 7/2012 | Regni et al. | |
| 2012/0281708 A1 | 11/2012 | Chauhan et al. | |
| 2013/0179991 A1 | 7/2013 | White et al. | |
| 2013/0227078 A1 | 8/2013 | Wei et al. | |
| 2013/0268997 A1 | 10/2013 | Clancy et al. | |
| 2013/0297673 A1 | 11/2013 | McGrath et al. | |
| 2014/0019583 A1* | 1/2014 | Sethuraman | H04L 65/601 |
| | | | 709/217 |
| 2014/0032759 A1 | 1/2014 | Barton et al. | |
| 2014/0108474 A1 | 4/2014 | David et al. | |
| 2014/0108506 A1* | 4/2014 | Borzycki | H04L 67/1095 |
| | | | 709/203 |
| 2014/0108665 A1 | 4/2014 | Arora et al. | |
| 2014/0173232 A1 | 6/2014 | Reohr et al. | |
| 2014/0208380 A1* | 7/2014 | Fay | H04N 21/4622 |
| | | | 725/134 |
| 2014/0223576 A1 | 8/2014 | Zhao | |
| 2014/0282940 A1 | 9/2014 | Williams et al. | |
| 2014/0297467 A1* | 10/2014 | Soller | H04L 65/1073 |
| | | | 705/26.8 |
| 2014/0372539 A1* | 12/2014 | Zaveri | H04L 51/046 |
| | | | 709/206 |
| 2014/0379921 A1 | 12/2014 | Morley et al. | |
| 2015/0012977 A1 | 1/2015 | Huh et al. | |
| 2015/0019480 A1 | 1/2015 | Maquaire et al. | |
| 2015/0052258 A1* | 2/2015 | Johnson | H04L 67/2804 |
| | | | 709/228 |
| 2015/0119000 A1* | 4/2015 | Miao | H04N 21/4367 |
| | | | 455/411 |
| 2015/0135275 A1 | 5/2015 | Matsugashita | |
| 2015/0163179 A1 | 6/2015 | Maes et al. | |
| 2015/0178805 A1 | 6/2015 | Curry et al. | |
| 2015/0188949 A1 | 7/2015 | Mahaffey et al. | |
| 2015/0237169 A1* | 8/2015 | Chen | H04L 12/2818 |
| | | | 726/7 |
| 2015/0293756 A1* | 10/2015 | Wright | G06F 21/577 |
| | | | 717/178 |
| 2015/0339136 A1 | 11/2015 | Suryanarayanan et al. | |
| 2015/0379072 A1* | 12/2015 | Dirac | G06N 20/00 |
| | | | 707/693 |
| 2016/0026497 A1 | 1/2016 | Gorga et al. | |
| 2016/0044035 A1* | 2/2016 | Huang | H04L 41/0806 |
| | | | 726/4 |
| 2016/0077824 A1 | 3/2016 | Vishnepolsky et al. | |
| 2016/0092339 A1 | 3/2016 | Straub et al. | |
| 2016/0112497 A1 | 4/2016 | Koushik et al. | |
| 2016/0125489 A1 | 5/2016 | Gupte et al. | |
| 2016/0132214 A1 | 5/2016 | Koushik et al. | |
| 2016/0134616 A1 | 5/2016 | Koushik et al. | |
| 2016/0134619 A1 | 5/2016 | Mikheev et al. | |
| 2016/0173646 A1 | 6/2016 | Austel et al. | |
| 2016/0197933 A1* | 7/2016 | Lapidous | H04L 63/102 |
| 2016/0218938 A1* | 7/2016 | Gupte | G06F 9/5072 |
| 2016/0275303 A1 | 9/2016 | Narayanaswamy et al. | |
| 2016/0292455 A1* | 10/2016 | Jebara | G06F 16/9535 |
| 2016/0330602 A1* | 11/2016 | Das | H04L 49/70 |
| 2016/0337365 A1 | 11/2016 | Beiter | |
| 2016/0337369 A1 | 11/2016 | Sanso | |
| 2016/0364554 A1* | 12/2016 | Lincoln | G06F 8/60 |
| 2017/0034127 A1 | 2/2017 | Singleton et al. | |
| 2017/0048314 A1* | 2/2017 | Aerdts | H04L 67/1097 |
| 2017/0083374 A1 | 3/2017 | Thomas et al. | |
| 2017/0086115 A1* | 3/2017 | Chung | H04L 45/44 |
| 2017/0134301 A1* | 5/2017 | Chen | G06F 9/00 |
| 2017/0134519 A1* | 5/2017 | Chen | H04L 67/32 |
| 2017/0185437 A1 | 6/2017 | Thomas et al. | |
| 2017/0188054 A1 | 6/2017 | Ma et al. | |
| 2017/0207929 A1* | 7/2017 | Qian | H04L 45/74 |
| 2017/0214550 A1 | 7/2017 | Kumar et al. | |
| 2017/0237812 A1* | 8/2017 | Sutardja | H04L 63/10 |
| | | | 709/217 |
| 2018/0219976 A1* | 8/2018 | Decenzo | G07C 9/00 |
| 2018/0270778 A1* | 9/2018 | Bharatia | H04W 8/08 |
| 2019/0065165 A1* | 2/2019 | Troutman | H04L 67/10 |
| 2019/0349430 A1* | 11/2019 | Sutardja | H04L 67/10 |
| 2020/0267208 A1* | 8/2020 | Chen | H04L 67/10 |

FOREIGN PATENT DOCUMENTS

| | | |
|---|---|---|
| CN | 102769884 A * | 11/2012 |
| WO | WO-2014116566 A2 * | 7/2014 ........ H04W 56/0025 |

* cited by examiner

IMPLEMENTING A STORAGE SYSTEM USING A PERSONAL USER DEVICE AND A DATA DISTRIBUTION DEVICE

INCORPORATION BY REFERENCE; DISCLAIMER

Each of the following applications are hereby incorporated by reference: application Ser. No. 15/432,785 filed on Feb. 14, 2017; application No. 62/296,478 filed on Feb. 17, 2016. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to storage systems. In particular, the present disclosure relates to implementing a storage system using a personal user device and a data distribution device.

BACKGROUND

Storage systems store content items according to various storage architectures. Examples of storage architectures include an object storage, a file system, a block storage, and/or a database. The term "content item" may be used to refer to a data file itself. Additionally or alternatively, the term "content item" may be used to refer to a fragment or portion of a data file.

Various types of storage devices may be used to implement a storage system. Examples of storage devices include a personal user device and a data distribution device. A personal user device is a storage device configured for storing content items of an individual and/or a private group of users. One or more personal user devices may be included within a private cloud infrastructure. A data distribution device is a storage device configured for storing content items of multiple independent entities. One or more data distribution devices may be included within a public cloud infrastructure. The entities using the public cloud may be referred to as "tenants."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. STORAGE SYSTEM ARCHITECTURE
3. IMPLEMENTING A STORAGE SYSTEM USING A PERSONAL USER DEVICE AND A DATA DISTRIBUTION DEVICE
4. EXAMPLE EMBODIMENTS
5. COMPUTER NETWORKS AND CLOUD NETWORKS
6. MISCELLANEOUS; EXTENSIONS
7. HARDWARE OVERVIEW

1. General Overview

One or more embodiments include implementing a storage system using a personal user device and a data distribution device. A personal user device stores a set of content items. The personal user device transmits at least a particular content item, of the set of content items, to a data distribution device for storage. A client device transmits a request for the particular content item to the personal user device. The personal user device determines a characteristic associated with the personal user device, the data distribution device, the client device, the request, and/or the particular content item. Based on the characteristic, the personal user device determines whether to serve the particular content item, or to redirect the client device to the data distribution device to obtain the particular content item.

Examples of characteristics used for making the redirection determination include a bandwidth of the personal user device and/or the data distribution device; a load of the personal user device and/or the data distribution device; a speed at which the personal user device and/or the data distribution device may serve the request; a priority level associated with the request and/or the client device; a geographical location and/or network of the personal user device, the data distribution device, and/or the client device; and whether the data distribution device stores a current version of the particular content item.

If the personal user device redirects the client device to the data distribution device, then the client device transmits a request for the particular content item to the data distribution device. In response to the request, the data distribution device transmits the particular content item to the client device.

One or more embodiments described in this Specification and/or recited in the claims may not be included in this General Overview section.

2. Storage System Architecture

Figure 1A:
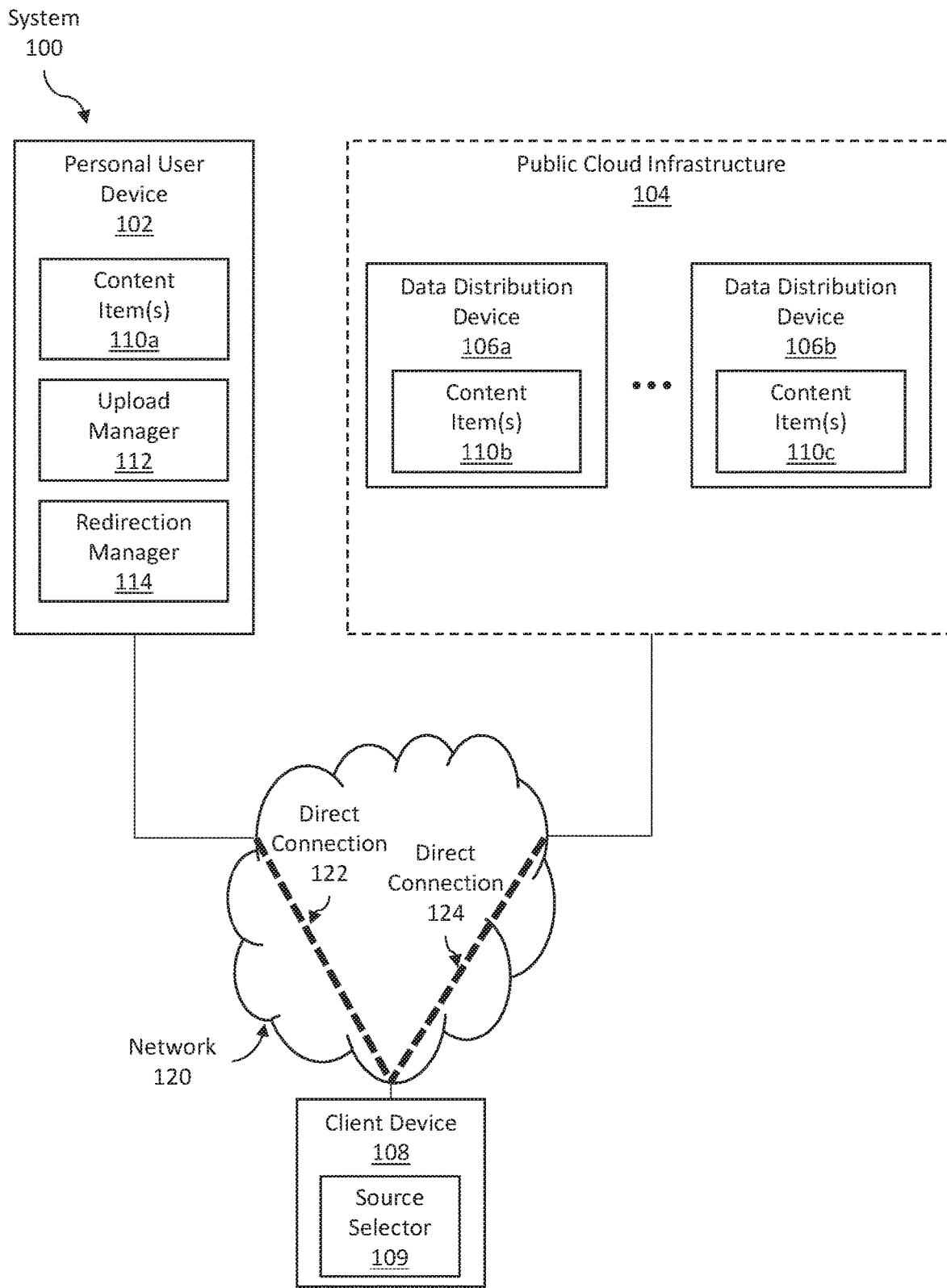
FIGS. 1A-B illustrate examples of a storage system, in accordance with one or more embodiments.
Figure 1B:
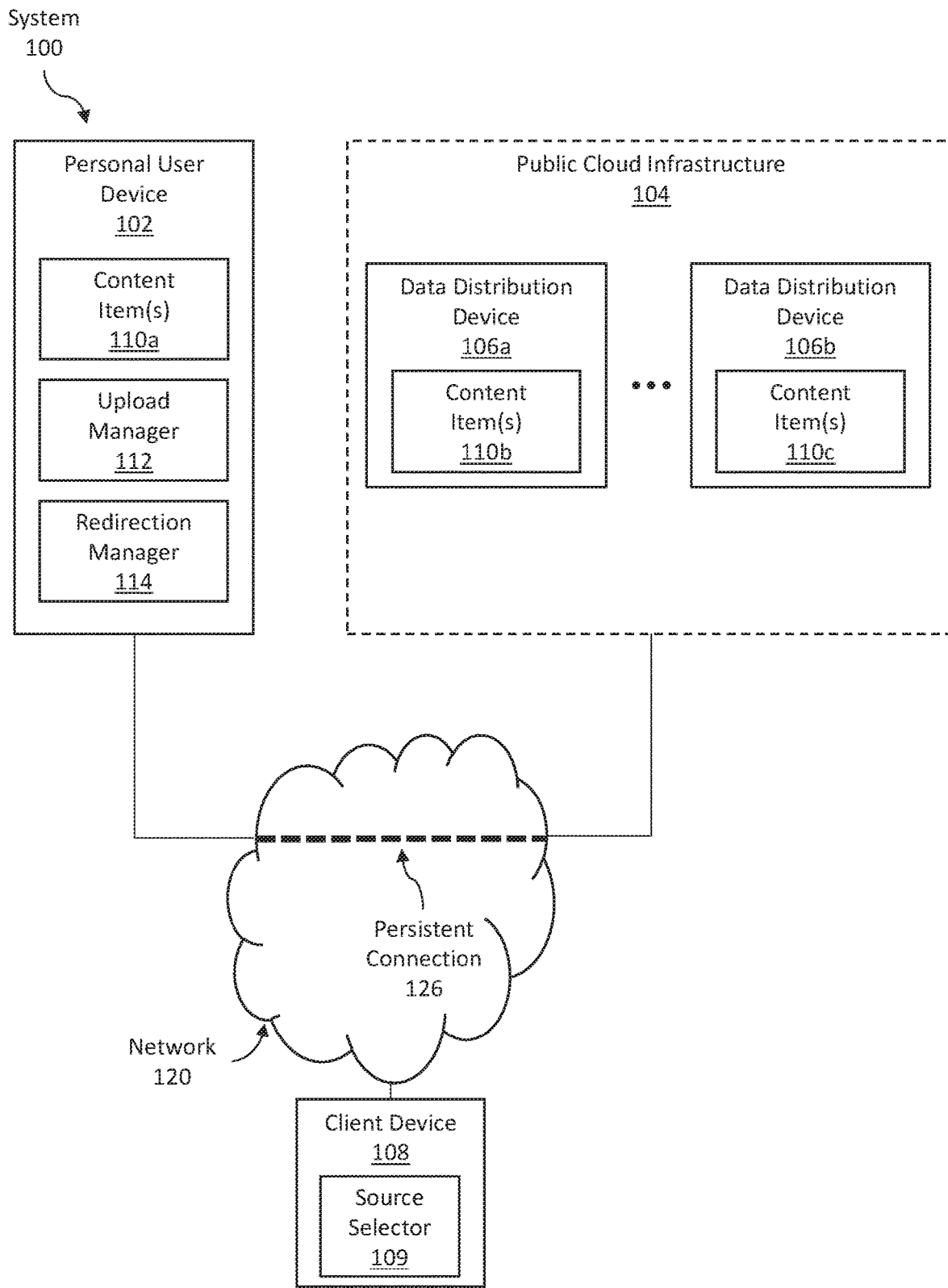

FIGS. 1A-B illustrate examples of a storage system, in accordance with one or more embodiments. As illustrated in FIGS. 1A-B, a system 100 includes a personal user device 102, one or more data distribution devices 106a-b, and a client device 108. In one or more embodiments, the system 100 may include more or fewer components than the components illustrated in FIGS. 1A-B. The components illustrated in FIGS. 1A-B may be local to or remote from each other. The components illustrated in FIGS. 1A-B may be implemented in software and/or hardware. Each component may be distributed over multiple applications and/or machines. Multiple components may be combined into one application and/or machine. Operations described with respect to one component may instead be performed by another component.

In one or more embodiments, a personal user device 102 is a storage device configured for storing content items 110a of an individual and/or a private group of users. One or more personal user devices 102 may be included within a private cloud infrastructure. As an example, a personal user device may be used by a group of family members. As another example, a personal user device may be used by employees of a company and/or a department. In some cases, a personal user device 102 may be connected to a local area network of a home or office. A client device 108 may access the personal user device 102 from within the local area network or from outside of the local area network. The client device 108 accesses the personal user device 102 from outside of the local area network by connecting to the local area network via another network 120, such as the Internet.

In one or more embodiments, a data distribution device (such as, data distribution devices 106a-b) is a storage device configured for storing content items (such as, content items 110b-c) of multiple independent entities, such as corporations, organizations, enterprises, and/or individuals. One or more data distribution devices may be included within a public cloud infrastructure 104. The entities using the public cloud may be referred to as "tenants." Each tenant is independent of one another. A business or operation of one tenant is separate from a business or operation of another tenant. A data distribution device, which is a shared computing resource for the tenants, may implement tenant isolation in order to ensure the privacy and/or security of the data of each tenant. A client device accesses a data distribution device via a public network 120, such as the Internet.

Additional embodiments and/or examples relating to cloud networks are described below in Section 5, titled "Computer Networks and Cloud Networks."

In an embodiment, a personal user device 102 and/or a data distribution device is implemented on one or more digital devices. The term "digital device" generally refers to any hardware device that includes a processor. Examples of digital devices include a hard drive, a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In one or more embodiments, a content item (such as, content items 110a-c) is a defined set of data. A content item may be a data file, or a fragment or portion of a data file. A content item may include text, audio, video, and/or other formats of data. A content item may be stored as various data structures, such as, an object, a file, a data block, or a database entry. A content item may be downloaded and/or streamed from a personal user device 102 or a data distribution device.

In one or more embodiments, a client device 108 is a device that requests a content item from a personal user device 102 and/or a data distribution device. The client device 108 may download and/or stream a content item from a personal user device 102 and/or a data distribution device. A client device 108 connects to a personal user device 102 and/or a data distribution device via a network 120. The network 120 may be, for example, the Internet. A client device is implemented on one or more digital devices.

In one or more embodiments, a network 120 provides connectivity between a personal user device 102, a data distribution device, and/or a client device 108. Devices may transmit information (such as, commands and/or content items) over the network 120 in the form of packets. Each packet is addressed to a particular destination. As an example, a personal user device 108 may transmit a packet that is addressed to a data distribution device. The network 120 may forward the packet based on the destination address indicated by the packet. Finally, the data distribution device may receive the packet from the network 120. In this example, the packet is transmitted from the personal user device 102 to the data distribution device via a "direct connection."

Additionally or alternatively, devices may transmit a stream of packets over the network 120 by establishing a session. The session may implement one or more protocols that improve and/or ensure the accuracy of data transmission over the network 120. One such protocol is Transmission Control Protocol (TCP). A session is established via a particular series of handshakes and/or messages. The session terminates via another particular series of handshakes and/or messages. Alternatively, the session terminates due to a timeout. A timeout occurs if a packet has not been transmitted over the session for longer than a threshold time period. Additionally or alternatively, the session may be authenticated and/or encrypted for security purposes. Authentication may be performed using one or more tokens.

Referring to FIG. 1A, the client device 108 may establish a direct connection 122 with the personal user device 102. Additionally or alternatively, the client device 108 may establish a direct connection 124 with the public cloud infrastructure 104 and/or a data distribution device thereof. The direct connection 122 and/or direct connection 124 may be established via a session, such as a TCP session and/or an authenticated session. The client device 108 may transmit requests for content items via the direct connection 122 and/or direct connection 124. The client device 108 may receive content items via the direct connection 122 and/or direct connection 124.

In an embodiment, the direct connection 122 between the client device 108 and the personal user device 102 may be authenticated. The data distribution device facilitates the authentication between the client device 108 and the personal user device 102. The client device 108 initially transmits a request to the data distribution device to establish an authenticated direct connection 124 with the data distribution device. After authenticating the client device 108, the data distribution device transmits information to the client device 108 and the personal user device 102 for the client device 108 and the personal user device 102 to establish an authenticated direct connection 122 that does not include the data distribution device. As an example, the data distribution device may transmit one or more authentication tokens to the client device 108 and the personal user device 102. The personal user device 102 may authenticate the client device 108 by verifying that the client device 108 possesses an authentication token matching the authentication token that the personal user device 102 received from the data distribution device. While the client device 108 and the personal user device 102 are establishing the authenticated direct connection 122, the client device 108 may transmit, to the data distribution device, a request for a content items. In response to the request, the data distribution device may serve the request for the content item and transmit the content item to the client device 108 via the direct connection 124. After the direct connection 122 between the client device 108 and the personal user device 102 is established, the client device 108 may use either the direct connection 124 with the data distribution device or the direct connection 122 with the personal user device 102 for obtaining each content item. The client device may determine whether to use the direct connection 124 or the direct connection 122 based on various factors, such as, a redirection instruction from the personal user device 102, and/or characteristics associated with the personal user device 102, the data distribution device, the client device 108 and/or the content item being requested.

Referring to FIG. 1B, the personal user device 102 may establish a direct connection with the public cloud infrastructure 104 and/or a data distribution device thereof. Optionally, the direct connection may be established as a persistent connection 126. A persistent connection 126 is a single session that is used to send multiple requests and/or responses. A persistent connection 126 may be established using a session that does not terminate due to a timeout. Alternatively, a persistent connection 126 may be maintained by transmitting keep-alive messages via the session so that the session does not timeout. The client device 108 may transmit, to the personal user device 102, requests for content items via (a) the direct connection 124 between the client device 108 and the data distribution device and (b) the persistent connection 126 between the data distribution device and the personal user device 102. This method of transmitting messages to the personal user device 102 through the data distribution device may be referred to as "tunneling." The personal user device 102 may transmit content items to the data distribution device via the persistent connection 126.

In one or more embodiments, an upload manager 112 refers to hardware and/or software configured to perform operations described herein for selecting and uploading content items to a data distribution device for storage. An upload manager 112 (and/or a component or module thereof) is implemented and/or executed by a personal user device 102. Examples of operations for selecting and uploading content items to a data distribution device for storage are described below with reference to FIG. 2A.

In one or more embodiments, a redirection manager 114 refers to hardware and/or software configured to perform operations described herein for redirecting a client device 108 to a data distribution device for obtaining a content item. An redirection manager 114 (and/or a component or module thereof) is implemented and/or executed by a personal user device 102. Examples of operations for redirecting a client device 108 to a data distribution device for obtaining a content item are described below with reference to FIG. 2A.

In one or more embodiments, a source selector 109 refers to hardware and/or software configured to perform operations described herein for selecting one or both of (a) the personal user device 102 and (b) a data distribution device for obtaining a content item. A source selector 109 (and/or a component or module thereof) is implemented and/or executed by a client device 108. Examples of operations for selecting the source for obtaining a content item are described below with reference to FIG. 2B.

Figure 2A:
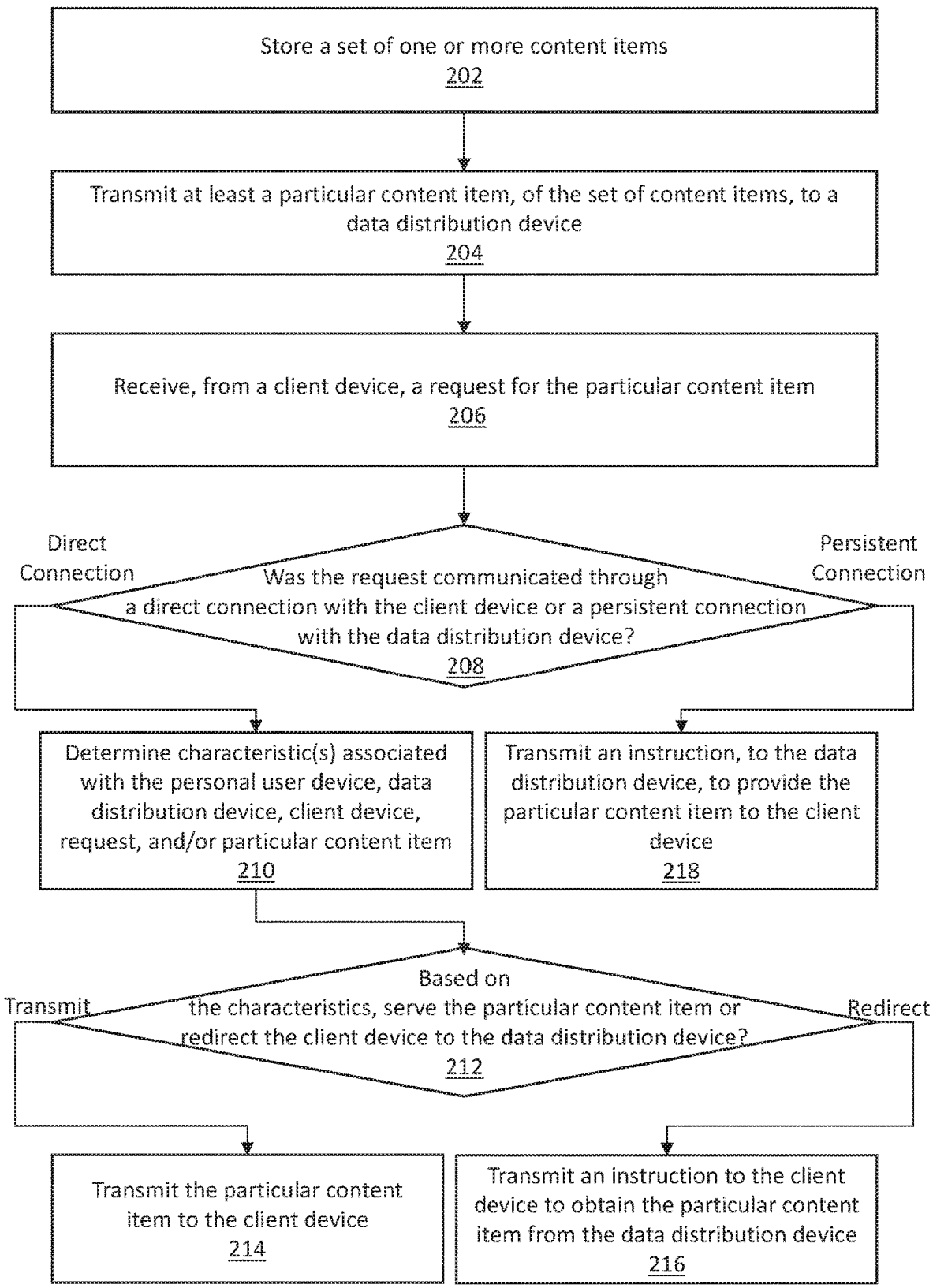
FIGS. 2A-B illustrate example sets of operations for implementing a storage system using a personal user device and a data distribution device, in accordance with one or more embodiments.

3. Implementing a Storage System Using a Personal User Device and a Data Distribution Device FIG. 2A illustrates an example set of operations for implementing a storage system using a personal user device and a data distribution device, in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

One or more embodiments include storing a set of one or more content items (Operation 202). A personal user device receives an instruction to store the set of content items from a user interface and/or another digital device. In response to receiving the instruction, the personal user device stores the content items. In an embodiment, the content items may be stored across one or more storage devices that are included within a private cloud infrastructure.

One or more embodiments include transmitting at least a particular content item, of the set of content items, to a data distribution device (Operation 204). The personal user device (and/or an upload manager thereof) selects one or more of the set of content items for transmission to and storage at the data distribution device. The selection may be made based on various criteria.

In an embodiment, the personal user device selects a particular content item for transmission to the data distribution device based on whether the particular content item has been shared. A content item is "shared" if a user, other than the creator and/or originator of the content item, is permitted to access the content item. If the particular content item is shared, then the personal user device transmits the particular content item to the data distribution device for storage.

As an example, User John Doe may submit a request, via a user interface, for a personal user device to store a particular video. User John Doe may submit an instruction to share the particular video with User Mary Smith. Based on the share instruction, User Mary Smith may be granted access to the particular video. The personal user device may select the particular video for transmission to a data distribution device.

In an embodiment, the personal user device selects a particular content item for transmission to the data distribution device based on the number of users with which the particular content item has been shared. If the particular content item is shared with more users, relative to other content items in the set of content items, then the personal user device transmits the particular content item to the data distribution device for storage.

As an example, User John Doe may submit a request, via a user interface, for a personal user device to store ten photos taken at a wedding. A photo of the bride and a photo of the groom are each shared with ten other users. A photo of the wedding bands is shared with five other users. A photo of the ring bearer is shared with two other users. The remaining six photos are not shared with any other users. The personal user device may determine that the photo of the bride, the photo of the groom, and the photo of the wedding bands are shared with the most users, when compared with the other seven photos. The personal user device may select the photo of the bride, the photo of the groom, and the photo of the wedding bands for transmission to a data distribution device.

In an embodiment, the personal user device selects a particular content item for transmission to the data distribution device based on whether remote access to the particular content item has been authorized. If remote access to the particular content item is authorized, then the personal user device transmits the particular content item to the data distribution for storage.

As an example, User John Doe may submit a request, via a laptop, for a personal user device to store a particular image. The laptop and the personal user device may be connected to a home local area network. User John Doe may submit an instruction to authorize access to the particular image from outside of the local area network. Hence, User John Doe may have access to the particular image, using his laptop or another digital device, from outside of the house. The personal user device may select the particular image for transmission to a data distribution device.

In an embodiment, the personal user device selects a particular content item for transmission to the data distribution device based on a similarity across the set of content items and/or a quality of the set of content items. If the particular content item is associated with a high quality, relative to other similar content items, then the personal user device transmits the particular content item to the data distribution device for storage.

As an example, User John Doe may submit a request, via a user interface, for a personal user device to store twenty images of a baby. The twenty images may have been taken in succession. The personal user device may analyze the images to determine a level of similarity associated with the images. The personal user device may determine that the level of similarity is above a specified threshold. Based on the level of similarity, the personal user device may determine that only 30% of the images are significant. The personal user device may analyze the images to determine a quality of each image. The quality may be defined by sharpness, brightness, contrast, saturation, and/or other attributes of the image. The personal user device may identify 30% of the twenty images (that is, six of the twenty images) with the highest quality. The personal user device may select the six images for transmission to a data distribution device.

Additional and/or alternative criteria may be used for selecting at least a particular content item, of the set of content items, for transmission to and storage at the data distribution device.

The personal user device has the option to transmit the particular content item to one or more of multiple data distribution devices. The multiple data distribution devices may be included within a public cloud infrastructure. The personal user device selects a data distribution device, from the multiple data distribution devices, for storing the particular content item based on various criteria.

In an embodiment, the personal user device selects the data distribution device for storing the particular content item based on a geographical proximity between the data distribution device and a user that has access to the particular content item. The personal user device determines the locations of each data distribution device. The personal user device determines the locations of each user having access to the particular content item. The personal user device selects the data distribution device that is closest to the users having access to the particular content item.

As an example, User John Doe may submit a request, via a user interface, for a personal user device to store a particular video. User John Doe may submit an instruction to share the particular video with User Mary Smith. The personal user device may determine that User Mary Smith resides in New York. The personal user device may determine that a public cloud infrastructure includes a server in California and a server in New York. The personal user device may determine that the New York server is closest to User Mary Smith. The personal user device may transmit the particular video to the New York server for storage.

In an embodiment, the personal user device selects the data distribution device for storing the particular content item based on a remaining capacity of the data distribution devices. The personal user device selects the data distribution device with the largest remaining capacity for storing the particular content item.

Additional and/or alternative criteria may be used for selecting a data distribution device, from multiple data distribution devices, for storing the particular content item.

The personal user device monitors the content and/or the capacity of the data distribution device. If the data distribution device has reached a maximum capacity and the data distribution device needs to store a new content item, then the personal user device selects one or more content items to be deleted from the data distribution device. The personal user device transmits an instruction to the data distribution device to overwrite the content items selected for deletion with the particular content item to be stored on the data distribution device. Various criteria may be used for selecting content items, stored on the data distribution device, to be deleted and/or overwritten.

In an embodiment, the personal user device selects a content item to be deleted from the data distribution device based on the sharing history of the content item. The personal user device maintains a record of the sharing history of each content item that has been transmitted to the data distribution device. The personal user device identifies a content item with the oldest "last shared date" for deletion. The personal user device transmits an instruction to the data distribution device to delete the content item with the oldest "last shared date" from the data distribution device.

Additional and/or alternative criteria may be used for selecting a content item to be deleted from the data distribution device.

The personal user device removes metadata associated with the particular content item prior to transmitting the particular content item to the data distribution device for storage. The personal user device removes information such as a creator of the particular content item, a creation date, a content item type, and/or a content item name. The personal user device generates a new identifier for the particular content item to be used by the data distribution device. The personal user device transmits the particular content item, with the new identifier, to the data distribution device. By removing the metadata, the data distribution device stores the particular content item without having information regarding the attributes of the particular content item. Since only the personal user device has information regarding the attributes of the particular content item, the privacy of the particular content item is maintained.

One or more embodiments include receiving, from a client device, a request for the particular content item (Operation 206). The client device transmits the request for the particular content item to the personal user device. In an embodiment, the particular content item was shared with a user of the client device. The user receives a notification that the particular content item has been shared. The user submits an instruction, via the client device, to request the particular content item. The personal user device receives the request for the particular content item.

The client device may transmit the request for the particular content item via a direct connection between the personal user device and the client device. The client device transmits the request via a direct connection by addressing one or more packets including the request to the personal user device. A network, such as the Internet, forwards the packets to the personal user device based on the destination address. The personal user device receives the packets including the request.

Alternatively, the client device may transmit the request for the particular content item via (a) a direct connection between the client device and the data distribution device and (b) a persistent connection between the personal user device and the data distribution device. This method of transmitting a message to the personal user device through the data distribution device may be referred to as "tunneling." The persistent connection is established between the personal user device and the data distribution device as described above with reference to the persistent connection 126 of FIG. 1B. The client device may transmit the request via the tunnel after a failed attempt to transmit the request via the direct connection. The client device addresses one or more packets including the request to the data distribution device. A network, such as the Internet, forwards the packets to the personal user device based on the destination address. The data distribution device receives the packets and forwards the packets onto the personal user device via the persistent connection. The personal user device receives the packets including the request.

One or more embodiments include determining whether the request was communicated through (a) a direct connection between the personal user device and the client device or (b) a persistent connection between the personal user device and the data distribution device (Operation 208). The personal user device receives packets including the request for the particular content item. The personal user device analyzes the packets to determine whether the packets were transmitted directly by the client device or were forwarded by the data distribution device. As an example, the personal user device may determine a source address associated with the packets. If the source address is an address of the client device, then request was received via a direct connection between the client device and the personal user device. If the source address is an address of the data distribution device, then request was received via a tunnel established by a persistent connection between the data distribution device and the personal user device. As another example, the personal user device may identify a session used for receiving the packets. If the session used for receiving the packets is the persistent connection between the personal user device and the data distribution device, then the request was received via the persistent connection. Otherwise, the request was received via a direct connection between the personal user device and the client device.

One or more embodiments include determining one or more characteristics associated with the personal user device, the data distribution device, the client device, the request and/or the particular content item (Operation 210). Examples of characteristics used for making the redirection determination include a bandwidth of the personal user device and/or the data distribution device; a load of the personal user device and/or the data distribution device; a speed at which the personal user device and/or the data distribution device may serve the request; a priority level associated with the request and/or the client device; a geographical location and/or network of the personal user device, the data distribution device, and/or the client device; and whether the data distribution device stores a current version of the particular content item. Additional and/or alternative characteristics may be used.

As an example, a personal user device may determine a bandwidth of the personal user device to serve the request for the particular content item. The personal user device may be connected to a home network that has a download speed of 45 Mbps and an upload speed of 6 Mbps. The personal user device may be serving two other requests at the same time. The personal user device may determine that there is insufficient bandwidth to serve an additional request. As illustrated in this example, the personal user device determines a characteristic associated with the personal user device.

As another example, a personal user device may determine a load of the data distribution device. The personal user device may transmit a request to the data distribution device for the load of the data distribution device. The data distribution device may determine the load based on a number of requests being served, a size of content items being served, a number of client devices being served, and/or other information. The data distribution device may transmit the load information to the personal user device. The personal user device may determine that the data distribution device has sufficient resources to serve another request. As illustrated in this example, the personal user device determines a characteristic associated with the data distribution device.

As another example, a personal user device may determine a priority level associated with the request for the particular content item. The personal user device may determine whether the request is associated with any high priority flags. As illustrated in this example, the personal user device determines a characteristic associated with the request.

As another example, a personal user device may determine a geographical location of the client device that transmitted the request for the particular content item. The personal user device may analyze the Internet Protocol (IP) address associated with the request to determine the geographical location of the client device. As illustrated in this example, the personal user device determines a characteristic associated with the client device.

As another example, a personal user device may determine a confidentiality level associated with the particular content item. The personal user device may determine whether the particular content item is associated with a high confidentiality level or a low confidentiality level. A high confidentiality level indicates that maintaining the confidentiality of the particular content item is very important. A low confidentiality level indicates that maintaining the confidentiality of the particular content item is less important. As illustrated in this example, the personal user device determines a characteristic associated with the particular content item.

As another example, a personal user device may determine whether the data distribution device stores a current version of the particular content item. The personal user device may determine a "last modified date" of the copy of the particular content item that is stored on the personal user device. Additionally, the personal user device may determine a date on which the personal user device last transmitted a copy of the particular content item to the data distribution device. If the particular content item was modified after the personal user device last transmitted a copy of the particular content item to the data distribution device, then the data distribution device does not store a current version of the particular content item.

One or more embodiments include determining whether (a) to serve the particular content item or (b) to redirect the client device to the data distribution device to obtain the particular content item, based on the characteristics (Operation 212). The personal user device (and/or a redirection manager thereof) determines whether to serve the particular content item itself or to redirect the client device based on the characteristics determined at Operation 210. In some embodiments, the personal user device may serve an entire data file, or may redirect the client device to the data distribution device to obtain the entire data file. In other embodiments, the personal user device may serve a portion of a data file, while redirecting the client device to the data distribution device to obtain another portion of the data file.

As an example, a personal user device may determine that the personal user device has sufficient bandwidth to serve the request for the particular content item. The personal user device may serve the particular content item to the client device.

Conversely, the personal user device may determine that the personal user device has insufficient bandwidth to serve the request for the particular content item. The personal user device may redirect the client device to the data distribution device to obtain the particular content item.

As another example, a personal user device may determine that a load of the data distribution device has reached a maximum capacity. The personal user device may serve the particular content item to the client device.

Conversely, the personal user device may determine that the data distribution device has sufficient capacity to serve the request. The personal user device may redirect the client device to the data distribution device to obtain the particular content item.

As another example, a personal user device may determine that a speed at which the personal user device may serve the request is above a specified threshold. The personal user device may serve the particular content item to the client device.

Conversely, the personal user device may determine that a speed at which the personal user device may serve the request is below a specified threshold. The personal user device may redirect the client device to the data distribution device to obtain the particular content item.

As another example, a client device may determine that a particular content item needs to be received within a threshold time period. The client device may determine that a data distribution device does not have the bandwidth to serve the particular content item within the time requirements. The client device may determine that both the data distribution device and the personal user device need to serve different portions of the particular content item concurrently in order to satisfy the time requirements. The client device may transmit a request for the particular content item, with a high priority flag, to a personal user device. The personal user device may determine that the request is associated with the high priority flag. Based on the high priority flag, the personal user device may serve one portion of the particular content item and to redirect the client device to the data distribution device to obtain another portion of the particular content item. In addition to or in lieu of the high priority flag, the client device may use other indicators to indicate that the client device requests the particular content item from one or more specific sources. The client device's request for the particular content item from specific sources (such as, the data distribution device) overrides any redirection determination that would have been made by the personal user device.

As another example, a personal user device may determine that the request, the client device, and/or a user of the client device is associated with a high priority. The personal user device may compare a bandwidth of the personal user device and a bandwidth of the data distribution device. If the bandwidth of the personal user device is higher, then the personal user device may serve the particular content item to the client device. Conversely, if the bandwidth of the data distribution device is higher, then the personal user device may redirect the client device to the data distribution device to obtain the particular content item.

As another example, a personal user device may determine a geographical location of the personal user device, the data distribution device, and the client device. The personal user device may determine that the client device is closer to the personal user device than the data distribution device. The personal user device may serve the particular content item to the client device. Conversely, the personal user device may determine that the client device is closer to the data distribution device than the personal user device. The personal user device may redirect the client device to the data distribution device to obtain the particular content item.

As another example, a personal user device may determine a network associated with the personal user device, the data distribution device, and the client device. The personal user device may determine that the client device is permitted to receive data from the network of the personal user device, but not permitted to receive data from the network of the data distribution device. The personal user device may serve the particular content item to the client device. Conversely, the personal user device may determine that the client device is permitted to receive data from the network of the data distribution device, but not permitted to receive data from the network of the personal user device. The personal user device may redirect the client device to the data distribution device to obtain the particular content item.

As another example, a personal user device may determine that the particular content item is associated with a high confidentiality level. Based on the high confidentiality level, the particular content item should not be transmitted via the network associated with the data distribution device. The personal user device may serve the particular content item to the client device.

Conversely, the personal user device may determine that the particular content item is associated with a low confidentiality level. The personal user device may redirect the client device to the data distribution device to obtain the particular content item.

As another example, a personal user device may determine that a data distribution device does not store a current version of the particular content item. The personal user device may serve the particular content item to the client device.

Conversely, the personal user device may determine that a data distribution device stores a current version of the particular content item. The personal user device may redirect the client device to the data distribution device to obtain the particular content item.

As another example, a particular data file may include multiple fragments. A personal user device may transmit the particular data file to a data distribution device for storage. Subsequently, a particular fragment of the particular data file may be updated on the personal user device. The personal user device may receive a request for the particular data file. The personal user device may determine that the data distribution device does not store a current version of the particular fragment, but does store current versions of other fragments of the particular data file. The personal user device may serve the particular fragment of the particular data file to the client device. Additionally, the personal user device may redirect the client device to the data distribution device to obtain the other fragments of the particular data file.

The personal user device may use the characteristics determined at Operation 210 in additional and/or alternative ways to determine whether to serve the particular content item or to redirect the client device to the data distribution device to obtain the particular content item.

If the personal user device determines to serve the particular content item, then the personal user device transmits the particular content item to the client device (Operation 214). The personal user device may allow the client device to download or stream the particular content item.

If the personal user device determines to redirect the client device to the data distribution device to obtain the particular content item, then the personal user device transmits an instruction to the client device to obtain the particular content item from the data distribution device (Operation 216). The personal user device refrains from serving the particular content item, stored by the personal user device, to the client device.

The personal user device transmits an identifier or address of the data distribution device to the client device. The client device transmits a request for the particular content item to the data distribution device. The data distribution device transmits the particular content item to the client device. The data distribution device may allow the client device to download or stream the particular content item.

Additionally or alternatively, the personal user device transmits an identifier or address of the first content item, on the data distribution device, to the client device. The client device retrieves the particular content item, from the data distribution device, using the identifier or address. The client device obtains the particular content item from the data distribution device. The client device may download or stream the particular content item.

In some embodiments, as described above, the personal user device may serve one portion of a data file while redirecting the client device to the data distribution device to obtain another portion of the data file. The client device downloads one portion from the personal user device and another portion from the data distribution device. The client device combines the different portions together to obtain the data file. Additionally or alternatively, the client device streams one portion from the personal user device and another portion from the data distribution device. The client device combines the different portions together to obtain a single continuous stream of the data file.

Hence, based on the above operations, the client device may transmit a request to the data distribution device for at least two purposes. First, as described above with reference to Operation 206, the client device may transmit a request to the data distribution device in order to tunnel the request to the personal user device through the persistent connection between the data distribution device and the personal user device. Second, as described above with reference to Operation 216, the client device may transmit a request to the data distribution device in order to obtain the particular content item from the data distribution device itself. The content, format, structure, and/or other characteristics of these two types of requests may be different. When the data distribution device receives a request, the data distribution device may determine the type of the request based on the content, format, structure, and/or other characteristics. Depending on the type of the request, the data distribution device may then forward the request to the personal user device through the persistent connection, or serve the request itself.

Returning to Operation 208, if the request was communicated via a persistent connection between the personal user device and the data distribution device, then the personal user device transmits an instruction, to the data distribution device, to provide the particular content item to the client device (Operation 218). The personal user device may transmit the request to the data distribution device via the persistent consistent. In response to the instruction, the data distribution device transmits the particular content item to the client device.

Figure 2B:
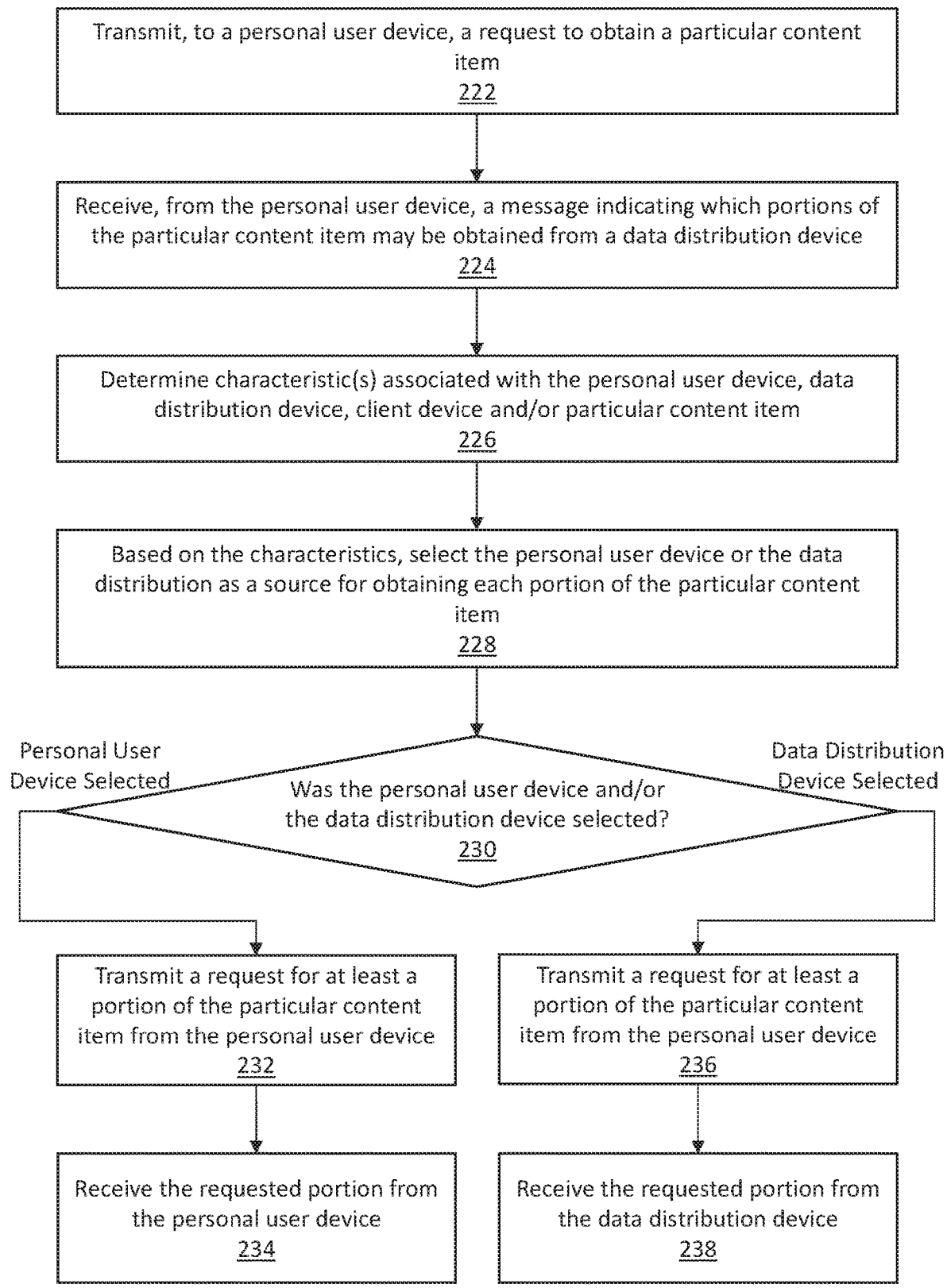

FIG. 2B illustrates another example set of operations for implementing a storage system using a personal user device and a data distribution device, in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

One or more embodiments include transmitting, to a personal user device, a request to obtain a particular content item (Operation 222). The client device transmits the request to the personal user device. The personal user device stores a copy of the particular content item. Further descriptions relating to transmitting a request for a content item to a personal user device are included above with reference to Operation 202.

One or more embodiments include receiving, from the personal user device, a message indicating which portions of the particular content item may be obtained from a data distribution device (Operation 224). After receiving the request for the particular content item, the personal user device determines whether to allow the client device to obtain the particular content item from the data distribution device. The personal user device may make the determination based on various factors.

As an example, the personal user device may determine whether the data distribution stores a current version of the particular content item. If the personal user device never transmitted the particular content item to the data distribution device, then the data distribution device does not store a current version of the particular content item. Otherwise, if the personal user device did transmit the particular content item to the data distribution device, but the copy of the particular content item on the personal user device was updated after the transmission, then the data distribution device does not a current version of the particular content item. If the data distribution does not store the current version of the particular content item, then the personal user device does not allow the client device to obtain the particular content item from the data distribution device.

As another example, the personal user device may determine whether the data distribution device stores a current version of each portion of the particular content item. The personal user device allows the client device to obtain, from the data distribution device, only those portions of the particular content item that are current on the data distribution device.

As another example, the personal user device may determine the security credentials of the client device. If the client device is not authorized to obtain the particular content item from the data distribution device, then the personal user device does not allow the client device to obtain the particular content item from the data distribution device.

The personal user device transmits a message to the particular content item indicating which portions of the particular content item may be obtained from a data distribution device. The message may indicate that (a) the client device may obtain the entire particular content item from the data distribution device, (b) the client device may obtain only one or more portions of the particular content item from the data distribution device, or (c) the client device may not obtain the particular content item at all from the data distribution device. The client device receives the message from the personal user device.

In an embodiment, the message, received by the client device from the personal user device, includes an identifier or address of the data distribution device. The client device may use the identifier to request the particular content item from the data distribution device.

As an example, the client device may transmit, to the personal user device, a first request for a baby photo. The personal user device may transmit a first message, to the client device, indicating that the client device may obtain the baby photo from the data distribution device. The first message may include an identifier of the data distribution device. The client device may use the identifier to request the baby photo from the data distribution device. Subsequently, the client device may transmit a second request for the baby photo. Since the client device already has the identifier of the data distribution device, the client device may indicate in the second request that the identifier is already known. The personal user device may transmit a second message, to the client device, indicating that the client device may obtain the baby photo from the data distribution device. The second message, however, does not include the identifier of the data distribution device, since the client device has indicated that the client device already has the identifier.

One or more embodiments include determining one or more characteristics associated with the personal user device, the data distribution device, the client device and/or the particular content item (Operation 226). Examples of characteristics used for selecting a source for the particular content item include a bandwidth of the personal user device and/or the data distribution device; a load of the personal user device and/or the data distribution device; a speed at which the personal user device and/or the data distribution device may serve the request; a priority level associated with the client device; and a geographical location and/or network of the personal user device, the data distribution device, and/or the client device. Additional and/or alternative characteristics may be used.

As an example, a client device may stream a particular content item from a personal user device. The client device may determine that the personal user device fails to serve the particular content item in a manner that meets a quality-of-service criteria. The quality-of-service criteria may require, for example, that the particular content item be displayed at the client device with no jittering. Another quality-of-service criteria may require, for example, that the particular content item be displayed at the client device in high-definition (HD) mode, rather than regular mode. Another quality-of-service criteria may require, for example, that the drainage rate of the client device's streaming buffer be below a specified threshold. Another quality-of-service criteria may require, for example, that the amount of data stored by the client device's streaming buffer be above a specified threshold. If the quality-of-service criteria is not met, then the client device may determine that there is insufficient bandwidth on the personal user device to serve the particular content item.

As illustrated in this example, the client device determines a characteristic associated with the personal user device.

Further descriptions relating to determining a set of characteristics are included above with reference to Operation 210. While some examples associated with Operation 210 describe the personal user device determining the set of characteristics, any component and/or module (such as, the client device) may determine the set of characteristics.

One or more embodiments include selecting the personal user device or the data distribution device as a source for obtaining each portion of the particular content item, based on the characteristics (Operation 228). The client device selects the personal user device or the data distribution device as a source based on the characteristics determined at Operation 226. In some embodiments, the client device may select the personal user device for obtaining an entire data file, or select the data distribution device for obtaining the entire data file. In other embodiments, the client device may select the personal user device for obtaining a portion of a data file, while selecting the data distribution device for obtaining another portion of the data file.

As an example, a client device may determine that the personal user device has sufficient bandwidth to serve the request for the particular content item. The client device may select the personal user device as a source for obtaining the particular content item.

Conversely, the client device may determine that the personal user device has insufficient bandwidth to serve the request for the particular content item. As described above, the client device may determine that the personal user device has insufficient bandwidth because the client device fails to receive portions of the particular content item, from the personal user device, in a manner that meets a quality-of-service criteria. The client device may switch to the data distribution device for receiving remaining portions of the particular content item. Alternatively, the client device may concurrently obtain different portions of the particular content item from both the personal user device and the data distribution device. The goal of the client device may be to maximum throughput and obtain the particular content item in the minimal amount of time possible.

As another example, a client device may determine a geographical location of the personal user device, the data distribution device, and the client device. The client device may determine that the client device is closer to the personal user device than the data distribution device. The client device may select the personal user device as a source for obtaining the particular content item. Conversely, the client device may determine that the client device is closer to the data distribution device than the personal user device. The client device may select the data distribution device as a source for obtaining the particular content item.

Further descriptions relating to selecting a source for obtaining a content item, based on the set of characteristics, are included above with reference to Operation 212. In Operation 212, the personal user device determines whether (a) to serve the particular content item or (b) to redirect the client device to the data distribution device to obtain the particular content item. Determining to serve the particular content item may be equivalent to selecting the personal user device as a source for the particular content item. Determining to redirect the client device to the data distribution device may be equivalent to selecting the data distribution device as a source for the particular content item. While some examples associated with Operation 212 describe the personal user device selecting the source for obtaining the content item, any component and/or module (such as, the client device) may select the source for obtaining the content item.

One or more embodiments include determining whether the personal user device and/or the data distribution device was selected (Operation 230). As described above, in some embodiments, the client device may select the personal user device for obtaining an entire data file, or select the data distribution device for obtaining the entire data file. In other embodiments, the client device may select the personal user device for obtaining a portion of a data file, while selecting the data distribution device for obtaining another portion of the data file.

If the personal user device was selected, then the client device transmits a request for at least a portion of the particular content item from the personal user device (Operation 232). The client device receives the requested portion of the particular content item from the personal user device (Operation 234).

If the data distribution device was selected, then the client device transmits a request for at least a portion of the particular content item from the data distribution device (Operation 236). The client device receives the requested portion of the particular content item from the data distribution device (Operation 238).

In an embodiment, the client device performs Operation 232 and Operation 234, without performing Operation 236 and Operation 238. Alternatively, the client device performs Operation 236 and Operation 238, without performing Operation 232 and Operation 234. Alternatively, the client device performs Operation 232 and Operation 234 with respect to one portion of the particular content item, and performs Operation 236 and Operation 238 with respect to another portion of the particular content item.

4. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
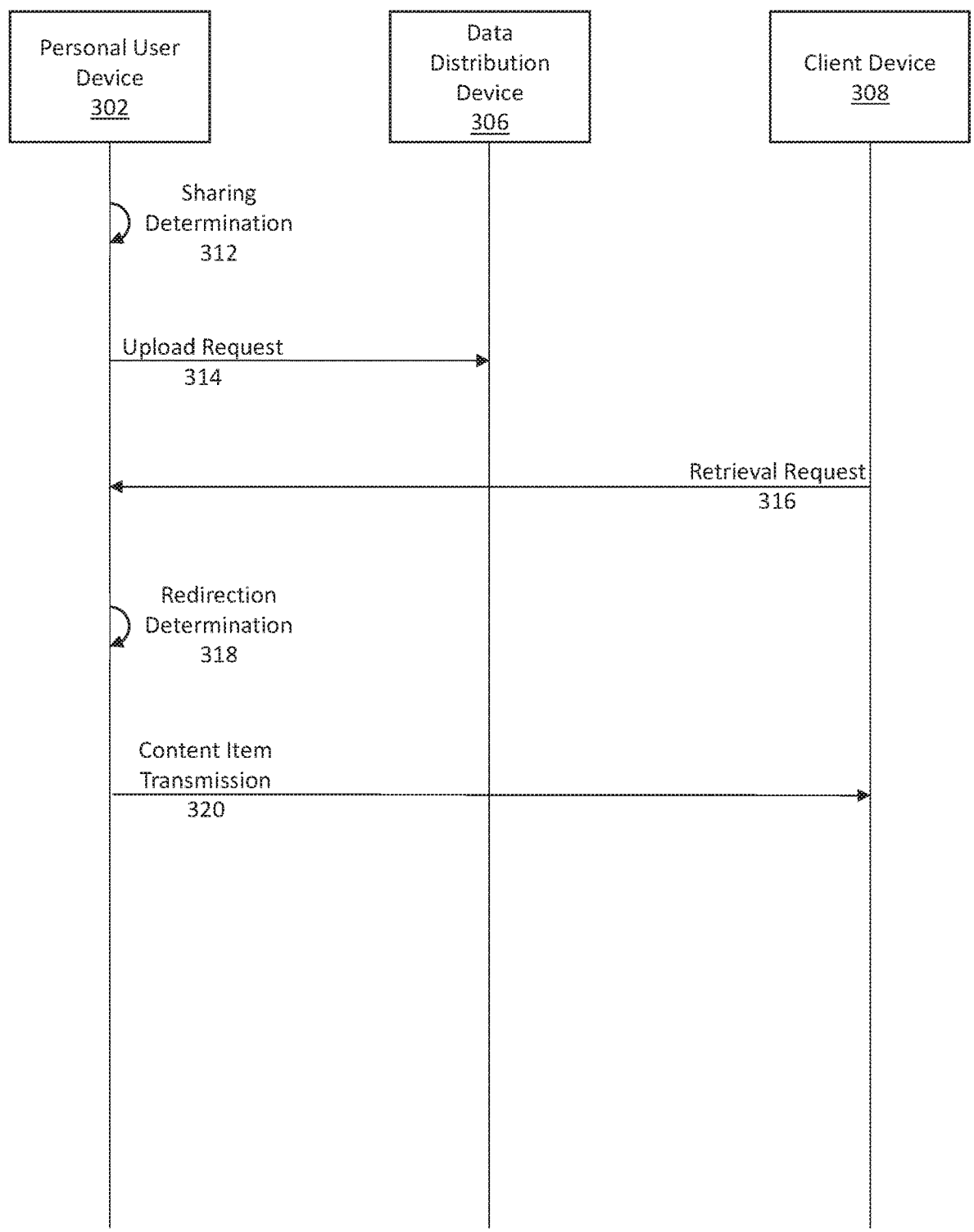
FIGS. 3A-C illustrate examples of implementing a storage system using a personal user device and a data distribution device, in accordance with one or more embodiments.
Figure 3B:
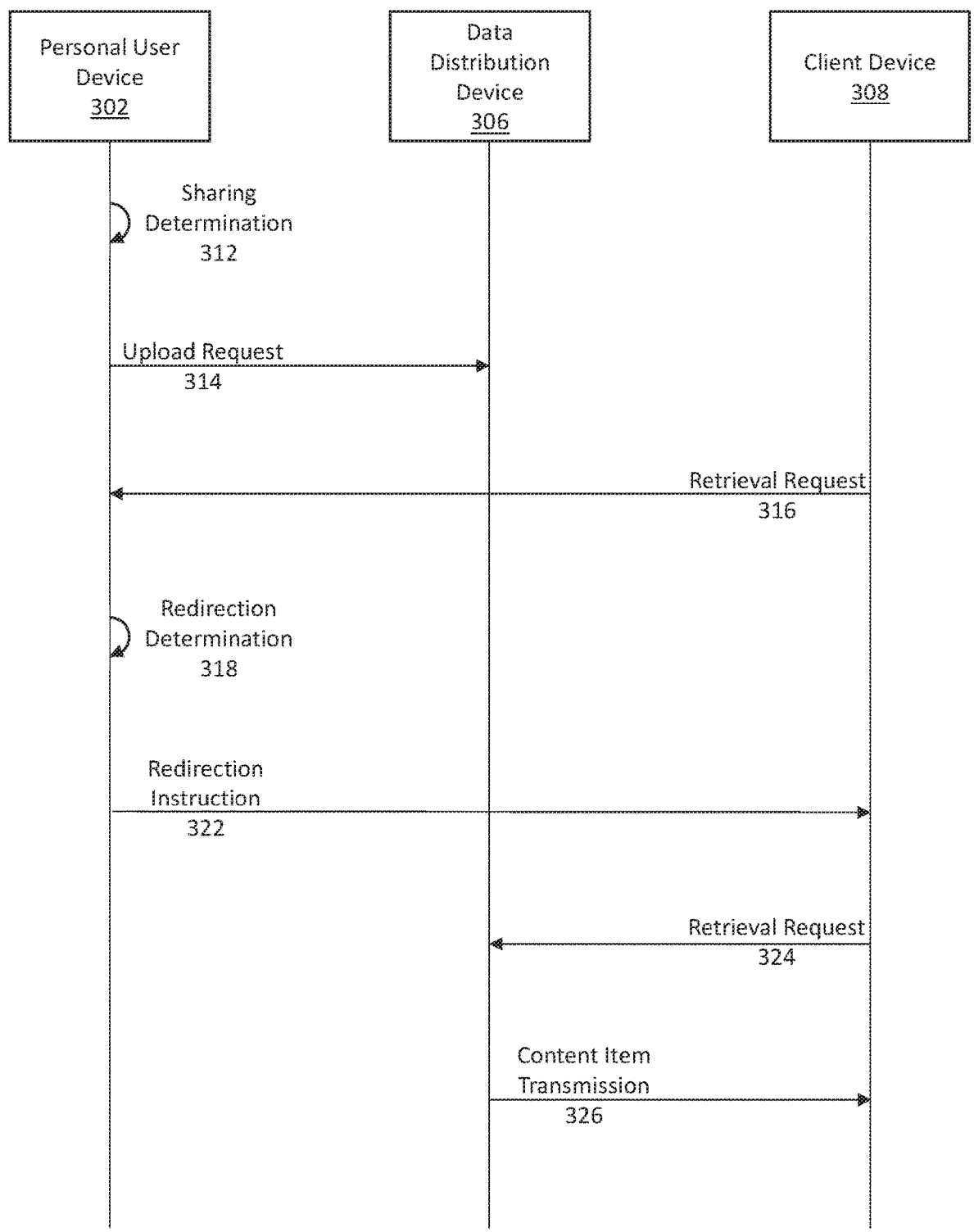
Figure 3C:
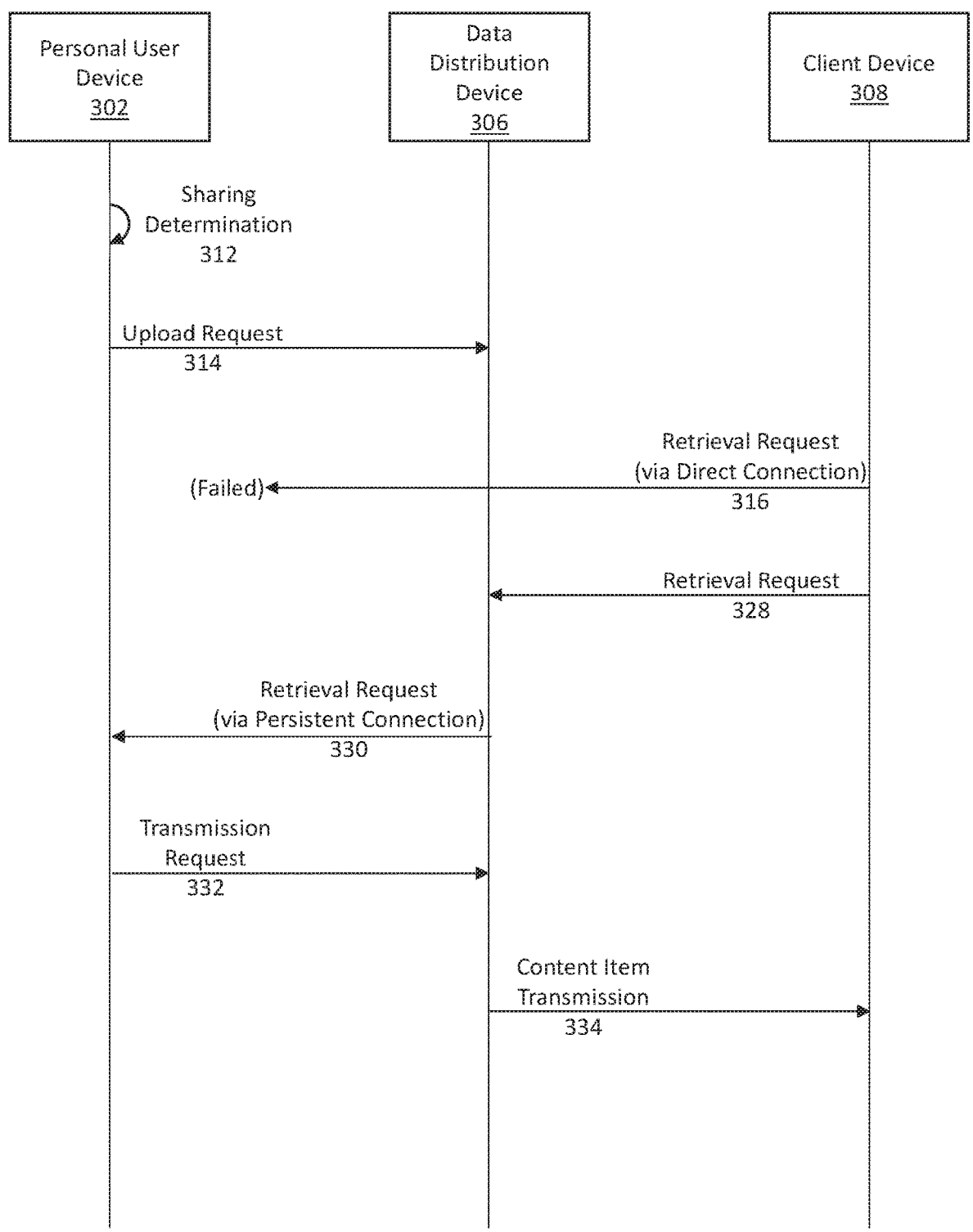

FIGS. 3A-C illustrate examples of implementing a storage system using a personal user device and a data distribution device, in accordance with one or more embodiments. Each of FIGS. 3A-C includes a personal user device 302, a data distribution device 306, and a client device 308.

FIG. 3A illustrates an example in which the personal user device 302 determines to serve a content item to the client device 308.

User John Doe submits an instruction, via a user interface, to the personal user device 302 to store a baby photo. The personal user device stores the baby photo.

User John Doe shares the baby photo with User Mary Smith. The personal user device 302 performs a sharing determination 312. The personal user device 302 determines that the baby photo has been shared with another user.

Based on the sharing of the baby photo, the personal user device 302 transmits an upload request 314 to the data distribution device 306. The personal user device 302 transmits the baby photo to the data distribution device 306 for storage at the data distribution device 306. The data distribution device 306 stores the baby photo.

User Mary Smith receives a notification that the baby photo has been shared with User Mary Smith. User Mary Smith submits an instruction, via the client device 308, to obtain the baby photo. The client device 308 transmits a retrieval request 316 to the personal user device 302. The retrieval request 316 is a request for the baby photo.

The personal user device 302 performs a redirection determination 318. The personal user device 302 determines a characteristic associated with the personal user device 302. The personal user device 302 determines that the personal user device 302 has sufficient bandwidth to serve the baby photo. The personal user device 302 determines to serve the baby photo to the client device 308.

Based on the determination to serve the baby photo, the personal user device 302 transmits the baby photo to the client device 308 (referred to as a "content item transmission 320" in FIG. 3A). The client device 308 receives the baby photo from the personal user device 302.

FIG. 3B illustrates an example in which the personal user device 302 determines to redirect the client device 308 to the data distribution device 306 to obtain a content item.

Similar to the example illustrated in FIG. 3A, the personal user device 302 performs the sharing determination 312, transmits the upload request 314, and receives the retrieval request 316.

The personal user device 302 performs a redirection determination 318. The personal user device 302 determines a characteristic associated with the personal user device 302. The personal user device 302 determines that the personal user device 302 has insufficient bandwidth to serve the baby photo. The personal user device 302 determines to redirect the client device 308 to the data distribution device 306 to obtain the baby photo.

The personal user device 302 transmits a redirection instruction 322 to the client device 308. The redirection instruction 322 includes an address of the data distribution device 306 that stores the baby photo.

In response to the redirection instruction 322, the client device 308 transmits a retrieval request 324 to the data distribution device 306. The retrieval request 324 is a request for the baby photo.

In response to the retrieval request 324, the data distribution device 306 transmits the baby photo to the client device 308 (referred to as a "content item transmission 326" in FIG. 3B). The client device 308 receives the baby photo from the data distribution device 306.

In another example (not illustrated), a combination of the operations illustrated in FIGS. 3A-B are performed.

User John Doe submits an instruction, via a user interface, to the personal user device 302 to store a video of a wedding ceremony. The personal user device stores the wedding video.

User John Doe shares the wedding video with User Mary Smith. The personal user device 302 performs a sharing determination 312. The personal user device 302 determines that the wedding video has been shared with another user.

Based on the sharing of the wedding video, the personal user device 302 transmits an upload request 314 to the data distribution device 306. The personal user device 302 transmits the wedding video to the data distribution device 306 for storage at the data distribution device 306. The data distribution device 306 stores the wedding video.

User John Doe makes an update to the wedding video. In particular, User John Doe adds a title caption to a beginning segment of the wedding video, stating "Christina & Jason. Feb. 1, 2016."

User Mary Smith receives a notification that the wedding video has been shared with User Mary Smith. User Mary Smith submits an instruction, via the client device 308, to obtain the wedding video. The client device 308 transmits a retrieval request 316 to the personal user device 302. The retrieval request 316 is a request for the wedding video.

The personal user device 302 performs a redirection determination 318. The personal user device 302 determines that the personal user device 302 has insufficient bandwidth to serve the wedding video. The personal user device 302 determines that the data distribution device 306 does not store a current version of the beginning segment of the wedding video. However, the data distribution device 306 stores a current version of the remainder of the wedding video. The personal user device 302 determines to serve the beginning segment of the wedding video to the client device 308, while redirecting the client device 308 to the data distribution device 306 for the remainder of the wedding video.

The personal user device 302 transmits the beginning segment of the wedding video the client device 308 (which is similar to the "content item transmission 320" in FIG. 3A).

The client device 308 obtains the beginning segment of the wedding video from the personal user device 302. The client device 308 may stream the beginning segment of the wedding video from the personal user device 302.

Additionally, the personal user device 302 transmits a redirection instruction to the client device 308 (which is similar to the "redirection instruction 322" in FIG. 3B). The redirection instruction includes an address of the data distribution device. The redirection instruction instructs the client device 308 to obtain the remainder of the wedding video from the data distribution device 306.

In response to the redirection instruction, the client device 308 transmits a retrieval request to the data distribution device 306 for the remainder of the wedding video (which is similar to the "retrieval request 324" in FIG. 3B).

In response to the retrieval request, the data distribution device 306 transmits the remainder of the wedding video to the client device (which is similar to the "content item transmission 326" in FIG. 3B).

The client device 308 obtains the remainder of the wedding video from the data distribution device 306. The client device 308 may stream the remainder of the wedding video from the data distribution device 306.

FIG. 3C illustrates an example in which the personal user device 302 receives a request for a content item from the client device 308 via a tunnel established by a persistent connection between the personal user device 302 and the data distribution device 306.

Similar to the example illustrated in FIG. 3A, the personal user device 302 performs the sharing determination 312, and transmits the upload request 314.

User Mary Smith receives a notification that the baby photo has been shared with User Mary Smith. User Mary Smith submits an instruction, via the client device 308, to obtain the baby photo. The client device 308 attempts to transmit a retrieval request 316 to the personal user device 302. However, the client device 308 is unable to establish a direct connection with the personal user device 302. The personal user device 302 may be protected by a firewall that prevents the direct connection with the client device 308.

The client device 308 then attempts to transmit a retrieval request 328, for the baby photo, via the tunnel established by the persistent connection between the personal user device 302 and the data distribution device 306. The client device 308 establishes a direct connection with the data distribution device 306. The client device 308 addresses the retrieval request 328 to the data distribution device 306.

The data distribution device 306 receives the retrieval request 328 and forwards the retrieval request 330, via the persistent connection, to the personal user device 302.

The personal user device 302 receives the retrieval request 330. The personal user device 302 determines that the retrieval request 330 has been communicated through the persistent connection with the data distribution device 306, rather than directly from the client device 308. The personal user device 302 transmits a transmission request 332 to the data distribution device 306. The transmission request 332 is a request for the data distribution device 306 to provide the baby photo to the client device 308.

In response to the transmission request 332, the data distribution device 306 transmits the baby photo to the client device 308 (referred to as a "content item transmission 334" in FIG. 3C). The client device 308 receives the baby photo from the data distribution device 306.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
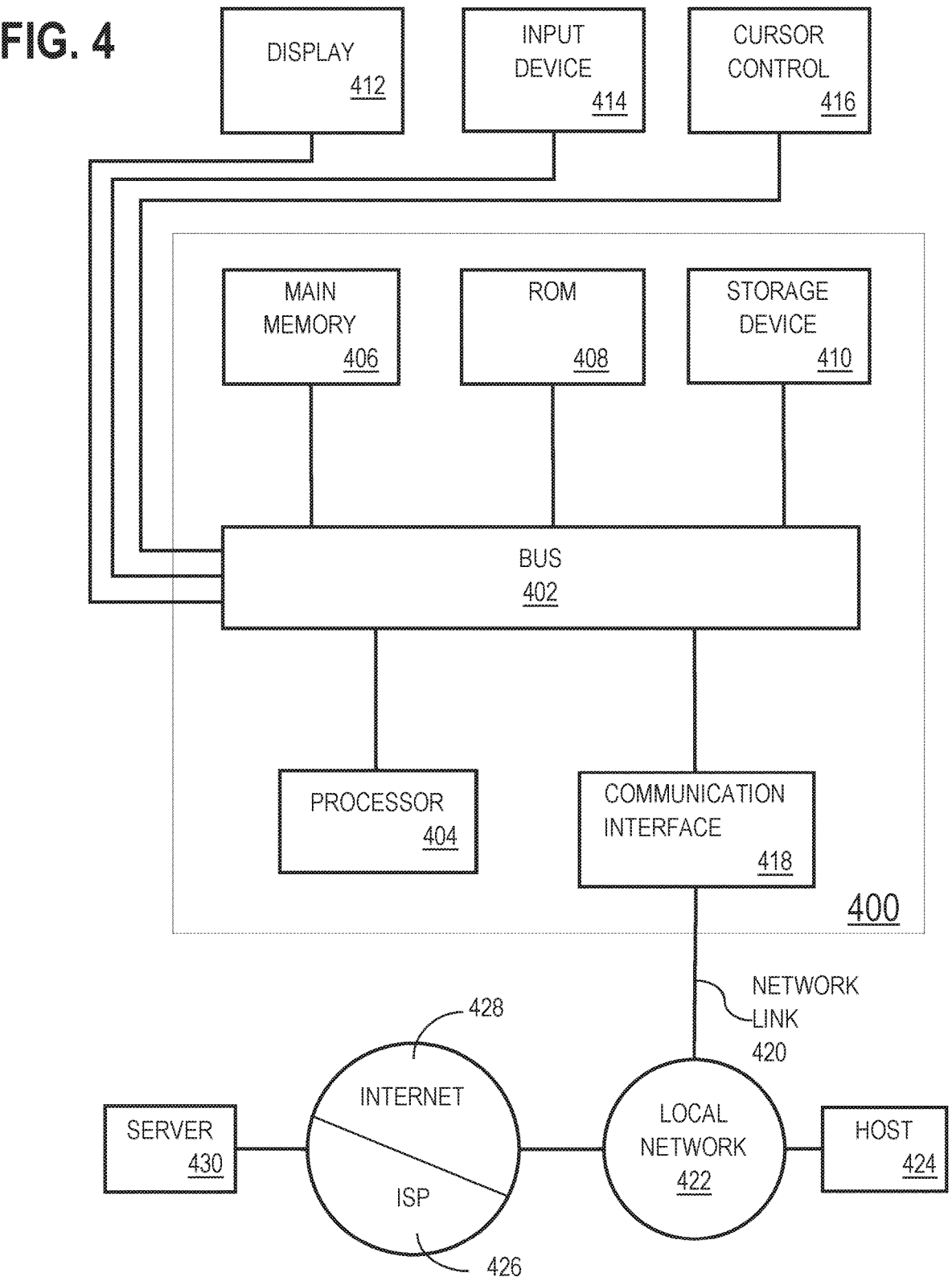
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    storing, by a personal user device, a set of one or more content items;
    transmitting, by the personal user device to a data distribution device, at least a first content item of the set of content items for storage on the data distribution device;
    receiving, by the personal user device from a client device, a first request for the first content item;
    determining whether the first request is received through (a) a direct connection between the personal user device and the client device or (b) a tunnel connection, facilitated by the data distribution device, between the personal user device and the client device;
    responsive at least to determining that the first request is received through the tunnel connection: transmitting, by the personal user device to the data distribution device, a second request for the data distribution device to transmit, to the client device, the first content item as stored on the data distribution device;
    receiving, by the personal user device from the client device, a second request for a second content item of the set of content items;
    determining whether the second request is received through (a) the direct connection between the personal user device and the client device or (b) the tunnel connection, facilitated by the data distribution device, between the personal user device and the client device;
    responsive at least to determining that the second request is received through the direct connection: transmitting, by the personal user device to the client device, the second content item.

2. The one or more media of claim 1, wherein the first request is transmitted from a first user of the client device, and the first content item belongs to a second user of the personal user device.

3. The one or more media of claim 1, wherein transmission of the first content item from the personal user device to the data distribution device is not performed in response to determining that the first request is received through the tunnel connection.

4. The one or more media of claim 1, wherein transmission of the first content item from the personal user device to the data distribution device is not performed in response to receiving the first request.

5. The one or more media of claim 1, wherein the tunnel connection comprises (a) a direct connection between the client device and the data distribution device and (b) a persistent connection between the data distribution device and the personal user device.

6. The one or more media of claim 1, wherein the direct connection between the personal user device and the client device does not involve transmissions through the data distribution device.

7. The one or more media of claim 1, wherein the direct connection between the personal user device and the client device was established based on at least one operation performed by the data distribution device.

8. The one or more media of claim 1, wherein determining whether the first request is received through (a) the direct connection between the personal user device and the client device or (b) the tunnel connection, facilitated by the data distribution device, between the personal user device and the client device is based at least on a source address associated with the first request.

9. The one or more media of claim 1, wherein the first request is transmitted via a persistent connection between the data distribution device and the personal user device.

10. The one or more media of claim 1, wherein transmitting, by the personal user device to the data distribution device, the first content item of the set of content items for storage on the data distribution device is responsive to determining that the first content item has been shared by a first user with a second user.

11. A system, comprising:
at least one device including a hardware processor; and
the system being configured to perform operations comprising:
storing, by a personal user device, a set of one or more content items;
transmitting, by the personal user device to a data distribution device, at least a first content item of the set of content items for storage on the data distribution device;
receiving, by the personal user device from a client device, a first request for the first content item;
determining whether the first request is received through (a) a direct connection between the personal user device and the client device or (b) a tunnel connection, facilitated by the data distribution device, between the personal user device and the client device;
responsive at least to determining that the first request is received through the tunnel connection: transmitting, by the personal user device to the data distribution device, a second request for the data distribution device to transmit, to the client device, the first content item as stored on the data distribution device;
receiving, by the personal user device from the client device, a second request for a second content item of the set of content items;
determining whether the second request is received through (a) the direct connection between the personal user device and the client device or (b) the tunnel connection, facilitated by the data distribution device, between the personal user device and the client device;
responsive at least to determining that the second request is received through the direct connection: transmitting, by the personal user device to the client device, the second content item.

12. The system of claim 11, wherein the direct connection between the personal user device and the client device does not involve transmissions through the data distribution device.

13. The system of claim 11, wherein the direct connection between the personal user device and the client device was established based on at least one operation performed by the data distribution device.

14. The system of claim 11, wherein transmission of the first content item from the personal user device to the data distribution device is not performed in response to determining that the first request is received through the tunnel connection.

15. The system of claim 11, wherein transmission of the first content item from the personal user device to the data distribution device is not performed in response to receiving the first request.

16. The system of claim 11, wherein the tunnel connection comprises (a) a direct connection between the client device and the data distribution device and (b) a persistent connection between the data distribution device and the personal user device.

17. A method, comprising:
storing, by a personal user device, a set of one or more content items;
transmitting, by the personal user device to a data distribution device, at least a first content item of the set of content items for storage on the data distribution device;
receiving, by the personal user device from a client device, a first request for the first content item;
determining whether the first request is received through (a) a direct connection between the personal user device and the client device or (b) a tunnel connection, facilitated by the data distribution device, between the personal user device and the client device;
responsive at least to determining that the first request is received through the tunnel connection: transmitting, by the personal user device to the data distribution device, a second request for the data distribution device to transmit, to the client device, the first content item as stored on the data distribution device;
receiving, by the personal user device from the client device, a second request for a second content item of the set of content items;
determining whether the second request is received through (a) the direct connection between the personal user device and the client device or (b) the tunnel connection, facilitated by the data distribution device, between the personal user device and the client device;
responsive at least to determining that the second request is received through the direct connection: transmitting, by the personal user device to the client device, the second content item;
wherein the method is performed by at least one device including a hardware processor.

18. The method of claim 17, wherein the tunnel connection comprises (a) a direct connection between the client device and the data distribution device and (b) a persistent connection between the data distribution device and the personal user device.

19. The method of claim 17, wherein transmission of the first content item from the personal user device to the data distribution device is not performed in response to determining that the first request is received through the tunnel connection.

20. The method of claim 17, wherein transmission of the first content item from the personal user device to the data distribution device is not performed in response to receiving the first request.

* * * * *